Sept. 10, 1946.  M. L. MENNESSON  2,407,317
CONTROL DEVICE FOR VARIABLE PITCH PROPELLERS
Filed Oct. 4, 1939  3 Sheets-Sheet 1
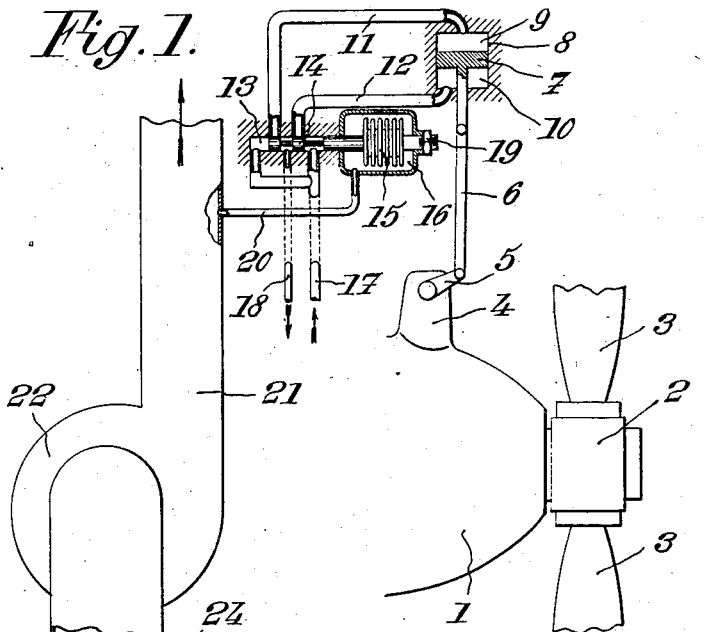
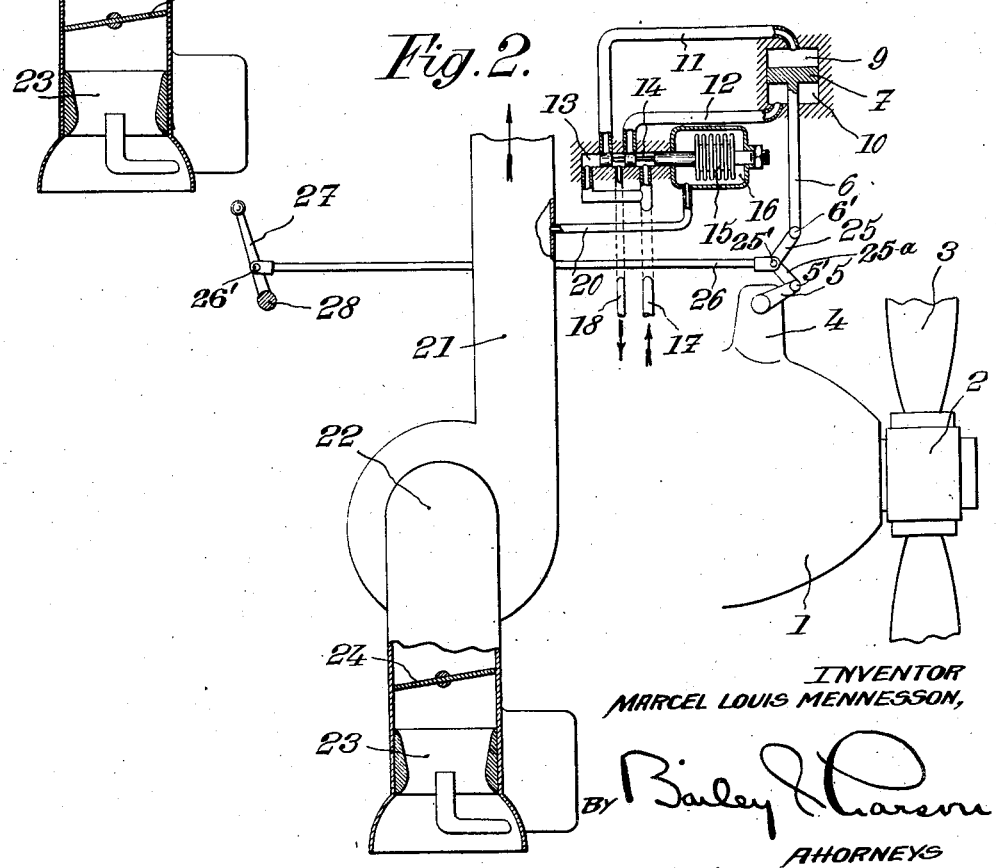
INVENTOR
MARCEL LOUIS MENNESSON,
BY Bailey
ATTORNEYS

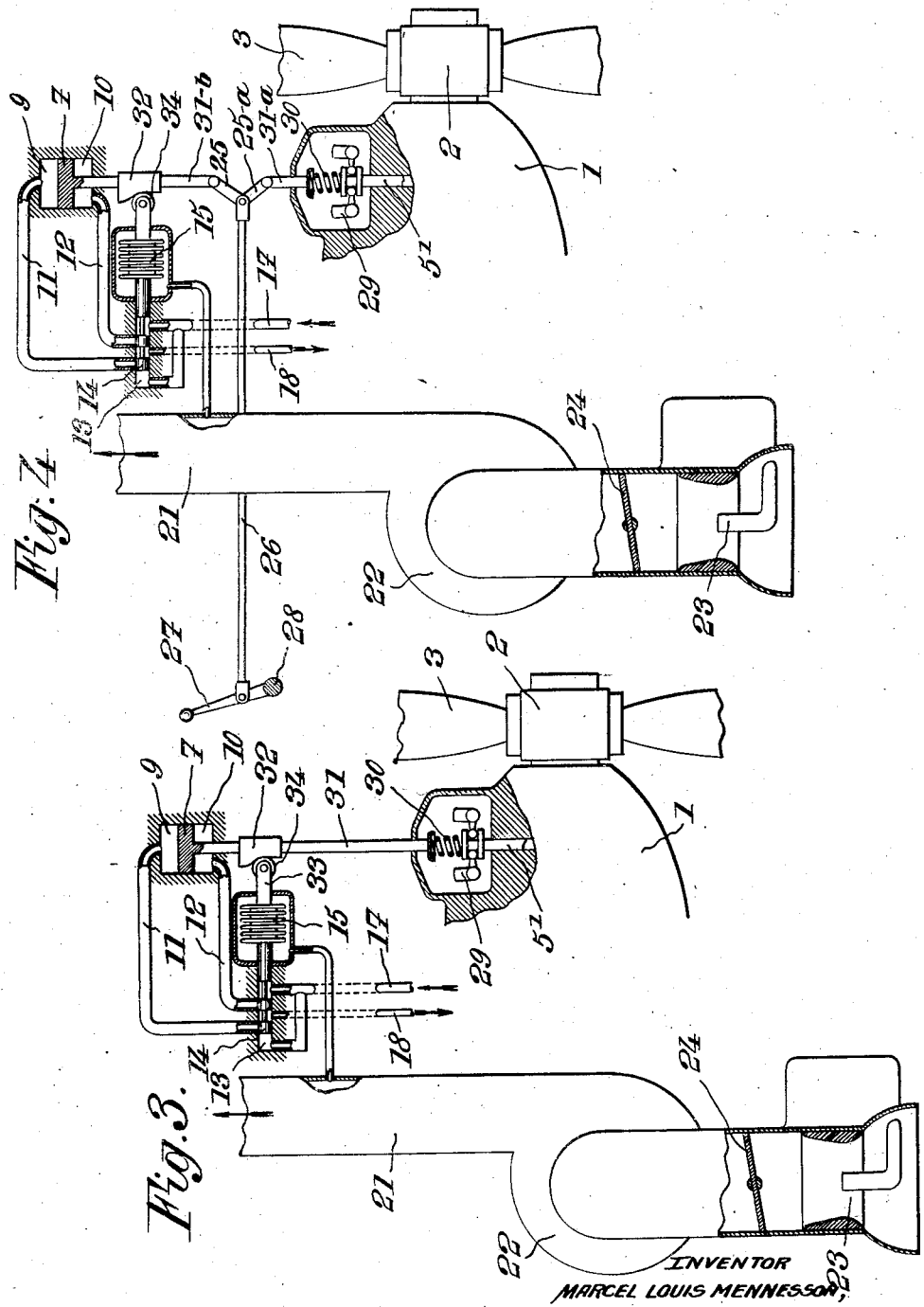

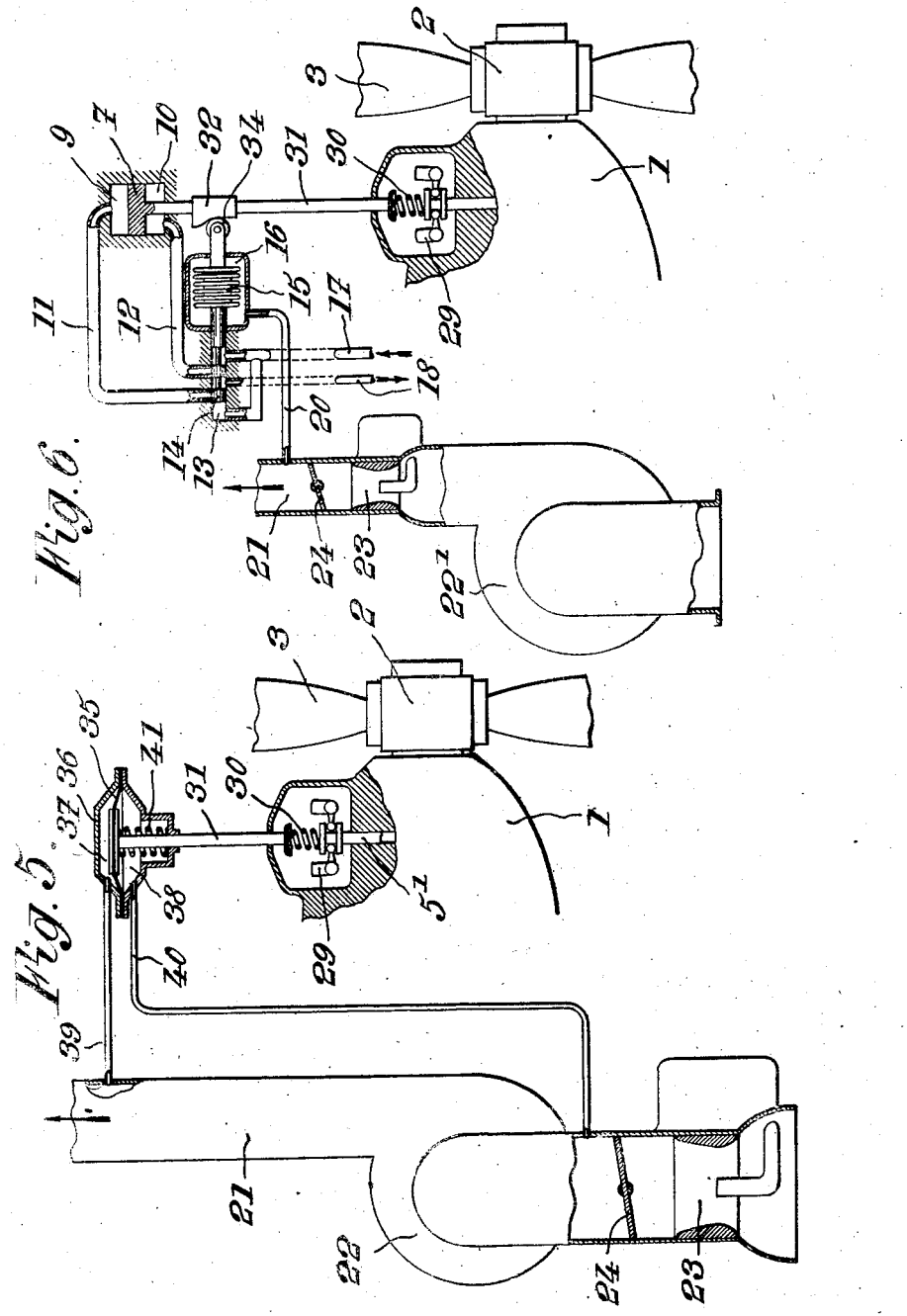

Patented Sept. 10, 1946

2,407,317

UNITED STATES PATENT OFFICE 2,407,317

CONTROL DEVICE FOR VARIABLE PITCH PROPELLERS

Marcel Louis Mennesson, Neuilly-sur-Seine, France; vested in the Alien Property Custodian Application October 4, 1939, Serial No. 297,931
In France November 17, 1938

2 Claims. (Cl. 170—135.6)

This invention relates to control devices for variable pitch propellers and it concerns more especially but not exclusively such propellers for aircraft.

Propellers the pitch of which can be varied to have two or a greater number of different values and propellers with automatically variable pitch, for which the pitch varies automatically in such a way that the speed of the engine, which drives the propeller, remains practically constant, are known.

It is also known that it is advantageous to be able to modify the value of the adjusted pitch or of the average pitch of a propeller (whether having automatically variable pitch or otherwise) according to the power furnished by the engine so that the propeller can function with an optimum efficiency.

The present invention has for its object so to make the control devices for these propellers that the above-mentioned result is obtained in a simple and efficient manner.

In general, in accordance with the invention control devices for such propellers (whether having automatically variable pitch or otherwise) are so constructed and arranged that they can cause the value of the pitch of the propeller to vary automatically as a function of the power furnished by the engine which drives the propeller.

Further, in accordance with the invention such control devices can be so constructed and arranged that they can cause the value of the pitch to vary automatically as a function of the absolute pressure which exists at a suitably chosen point of the intake pipe of the engine driving the propeller.

Another arrangement in accordance with the invention is such that the control devices are so constructed and arranged that they can cause the value of the pitch to vary automatically as a function of the differential pressure which exists between two suitably chosen points of the intake pipe of the engine driving the propeller.

Another feature of the invention is to provide such control devices with an operating member placed at the disposal of the pilot for correcting the action of the automatic means and, if necessary, for replacing the said automatic means in the case of breakdown of these means.

In order that the invention may be better understood it will now be described with reference to the accompanying drawings which are given by way of example only and in which:

Fig. 1 shows, in diagrammatic elevation (parts in section) a control device constructed according to the invention and applied to a variable-pitch propeller capable of two pitch settings.

Fig. 2 shows, similarly, an analogous device but which comprises a control lever at the disposal of the pilot.

Figs. 3 and 4 show, similarly, devices of the same type but to control a constant speed propeller with automatically variable pitch.

Fig. 5 shows a variation of the device according to Fig. 3.

Fig. 6 shows the device according to Fig. 4 in the case where the carburation system is slightly different from that shown in the other figures.

In all the figures of the drawings there have been shown, diagrammatically, a part of an internal combustion engine 1 as well as a part of a propeller driven thereby, the hub 2 and a part only of the blades 3 being shown. The mechanism by which the modification of the inclination of the blades is effected has not been shown in detail on the drawings, this mechanism, which is well known, not forming the subject of the invention and being able to function by mechanical, hydraulic, pneumatic or electrical means.

The control proper of this mechanism also has not been shown in detail for it can be constituted in any appropriate manner, by being suited to the type of operation of the mechanism in question. The control is housed in a casing 4 and is operated by a member 5 (Figs. 1 and 2) or $5^1$ (Figs. 3 to 6).

In Figs. 1 and 2 this operating member is constituted, for example, by a lever 5 connected by a link 6 to a piston 7 which divides a cylinder 8 into two chambers 9 and 10. These two chambers communicate, respectively by pipes 11 and 12, with a cylindrical chamber 13 in which works a distributing slide valve 14 actuated automatically by a member sensitive to pressure, for example, by a manometric capsule 15 enclosed in a casing 16.

The distributing slide valve 14 permits a fluid under pressure (for example oil, or any other liquid, or even gaseous fluid) to be sent, by the conduit 17, into the chamber 9 or 10 according to the position occupied by this slide valve. The chamber, which is not in communication with the source of fluid under pressure, is then connected to an outlet pipe 18 for this fluid.

The manometric capsule 15 comprises a regulating nut 19 and it is subjected, by the pipe 20, to the pressure which prevails in the intake pipe 21 of the engine.

It has been assumed, for the device shown in Fig. 1 as well as for those indicated in Figs. 2 to 5, that the engine is fed through a compressor 22 which compresses the combustible mixture delivered by a carburettor 23 of any appropriate type and the output of which is regulated by a throttle valve 24.

For the purpose of the present invention, the carburetion device proper is not important. It is simply shown to indicate its co-operation, that is to say the engine can comprise any carburation system and be fed either by a carburettor of any known type or by an appropriate system to effect the injection of the fuel into the intake pipe 21 or into the cylinders. It can also comprise a compressor, provided if desired with an admission-limiting means, or be without a supercharging system.

The operation of the device, shown in Fig. 1, is the following.

It is known, when variable pitch propellers are employed, that it is advantageous, in general, to utilise a small pitch when the engine gives all its power and, on the contrary, a large pitch when the power of the engine is reduced. Now, it is a fact that the pressure in the intake pipe varies in the same way as the power of the engine. It is therefore possible to act automatically on the inclination of the blades of the propeller by utilising the pressure which prevails in this intake pipe.

For the device according to Fig. 1, this pressure is transmitted by the pipe 20 and acts on the manometric capsule 15. If the engine functions in the neighbourhood of its full power, the capsule 15 is compressed, which allows the fluid under pressure, supplied by the pipe 17, to enter into the chamber 9 by the pipe 11. The piston 7 is therefore forced upward lowering the lever 5, which then controls the mechanism by which the modification of the inclination of the blades of the propeller is effected in such a direction that the pitch of the propeller has its smallest value. Inversely, if the power of the engine is reduced, the pressure in the intake pipe decreases and the capsule 15 lengthens. The fluid under pressure passes from the pipe 17 into the chamber 10, which forces the piston 7 downward and acts in the opposite direction on the lever 5. As a result thereof the pitch of the propeller reaches its greatest value. The control of the lever 5 by the piston 7 which occupies, for each operation, one or the other of its extreme positions, shows that Fig. 1 relates to a propeller with two pitches only.

In the device, illustrated in Fig. 2, the lever 5 for operating the control mechanism 4 for changing the pitch of the propeller, is connected to the rod 6 of the piston 7 by a pair of links 25, 25—$a$ which are pivoted on the lever 5 and the rod 6 by pivot pins 5' and 6', respectively. These links 25, 25—$a$ are pivotally interconnected by a pivot pin 25' which also pivots the links 25, 25—$a$ on the end of a link 26 which has its other end pivoted, by a pivot pin 26', on a hand lever 27 within reach of the pilot and pivoted at a fixed point 28. It is to be understood that the hand lever 27 is provided with the usual latching means (not shown) to prevent accidental movement of the lever 27. The lever 27 being thus held immovable, the control lever 5 is responsive to movements of the piston 7 transmitted by rod 6 through links 25 and 25—$a$ to lever 5. Reciprocation of rod 6 by piston 7 causes reciprocation of link 25, link 26 about pin 26', and link 25—$a$. The movements of rod 6 are transmitted to lever 5 through the pivoted links 25, 25—$a$ because they are pivoted to one end of link 26, and the other end of link 26 is pivoted by pin 26' to fixed lever 27. When the rod 6 is moved downwardly by the piston 7, it carries the link 25 downwardly as it pivots around pins 6' and 25', thereby swinging link 26 downwardly about its pin 26', and thereby swinging link 25—$a$ downwardly as it pivots about pins 25' and 5', thereby swinging lever 5 downwardly to operate the control mechanism 4 for changing the pitch of the propeller. When the rod 6 is moved upwardly by the piston 7, the reverse action occurs.

However, if the pilot desires to correct the action of the piston 7, either to effect a slight correction, or to act in place of this latter (when the servo-motor, formed by the capsule 15 and by the piston 7, is damaged), he can act on the hand lever 27 to displace the rod 26. As the piston 7 is immobilised at one of the extremities of its stroke, it forms a fixed point and the hand lever 27 shifts the link 26 to the right or to the left, to move the lever 5. When the link 26 is shifted to the right, it will swing link 25 downwardly about its pin 6' and 25' causing link 26 to move downwardly about its pin 26' thereby swinging link 25—$a$ downwardly about its pins 25' and 5' thus swinging lever 5 downwardly about its pin 5' to operate the control mechanism 4. When the link 26 is moved to the left, the reverse action occurs.

Fig. 3 shows a device similar to that of Fig. 1 but applied to a constant speed propeller with automatically variable pitch and which, for example, comprises for this purpose and as is usual a centrifugal governor formed in the usual manner by rotating masses 29 the effect of which is counterbalanced by a spring 30, these masses acting on a sliding axial member $5^1$ which serves to actuate the mechanism of the propeller blades, either through a servo-motor, or through electric contacts, according to the type of propeller employed. This centrifugal governor causes the inclination of the blades in the neighbourhood of an average inclination to vary in such a way that the speed of the engine always remains practically constant. The average position of the blades 3 therefore determines an average pitch and this pitch is, obviously, a function of the tension of the spring 30 which counterbalances the effect of the masses 29.

The invention therefore consists in causing to correspond automatically to each pressure, existing in the intake pipe 21 of the engine, a corresponding average pitch of the propeller. For this purpose, the pressure prevailing in this pipe 21 acts, through a servo-motor formed like that of Figs. 1 and 2, on a rod 31 adapted to modify the stress of the spring 30. Moreover, the piston 7 acts on a cam 32 which moves the fixed point of the manometric capsule 15 through a rod 33 and of a roller 34 which rolls on the said cam.

If the power of the engine increases, the pressure in the pipe increases in consequence and the capsule 15 contracts so as to send the fluid under pressure into the chamber 9 through the pipe 11. The piston 7 is forced upward compresssing the spring 30, which diminishes the pitch of the propeller since the speed of rotation of the engine must increase so that the masses 29 can counterbalance this new compression of the spring 30 and restore the initial position of the rod $5^1$ which controls the mechanism of the blades.

During this descending movement, the piston 7 carries along the cam 32 which forces the roller 34 and, in consequence, the capsule 15 and the distributor slide valve 14, towards the left of Fig. 3, up to the moment when this movement annuls the effect of the contraction of the capsule and when the bosses of the distributing slide valve 14 again cover the orifices of the pipes 11 and 12. At this moment a position of equilibrium is attained and it is seen that this position is solely a function of the pressure prevailing in the intake pipe 21. If this pressure diminishes—which takes place when the power required from the engine is reduced—the capsule 15 expands, the piston 7 ascends to a fresh position of equilibrium relaxing the spring 30 and, in consequence, increasing the pitch of the propeller.

The profile of the cam 32 is formed in such a way that to each value of the pressure, existing in the pipe 21, there corresponds an accurate value of the average pitch of the propeller.

In the device, illustrated in Fig. 4, the tension of the spring 30 is controlled by a rod 31—a which is connected to a piston rod 31—b of the piston 7 by a pair of links 25, 25—a which are pivoted on link 26 on lever 27, as in the device of Fig. 2. It is obvious that the tension of spring 30 is controlled by the movements of the piston 7 and the hand lever 27, in the same manner as the control lever 5 of the device of Fig. 2, as above fully described.

Fig. 5 shows a device similar to that of Fig. 3, but for which the servo-motor, controlled by the manometric capsule, has been replaced by a diaphragm 35 which separates a box 36, in which it is housed, into two chambers 37 and 38 connected respectively by pipes 39 and 40 to two suitably chosen points of the intake pipe 21 of the engine. For the particular case of the example shown, but without this being compulsory, the pipe 39 opens into the pipe 21 downstream of the supercharging compressor 22 and the pipe 40 opens upstream of this compressor. The diaphragm 35 acts, by the rod 31, on the spring 30. It is acted on, moreover, by a spring 41 which tends to oppose the effect of the pressure which prevails in the chamber 37.

In the case of Fig. 5, the differential pressure existing between the two chambers 37 and 38 increases with the power of the engine, so that the rod 31 is displaced downwardly, which compresses the spring 30 and, in consequence, reduces the average pitch of the propeller. Obviously, the rod 31 could be provided with the hand lever device shown in Figs. 2 and 4 for correcting the action of the diaphragm 35 on the governor 29.

In all the cases considered any known servo-motor system can be employed, without being limited to the systems indicated.

The device according to Fig. 6 is applicable in the case of a propeller with automatically variable pitch and which is driven by an engine the supercharging compressor $22^1$ of which delivers into the carburettor 23. In this case, the power of the engine is a function of the pressure which prevails in the intake pipe 21, downstream of the throttle member 24 and it is sufficient to make the casing 16 with the manometric capsule 15 communicate, by the pipe 20, with this part of the intake pipe.

What I claim is:

1. In a control device, the combination of a variable-pitch propeller; an aircraft engine, for driving said propeller; means for feeding a fuel-air mixture to the engine; a conduit between said feeding means and the engine; means for changing the pitch of the propeller, comprising a governor dependent upon the engine speed; a reacting spring in said governor; means for changing the tension of said spring, comprising a slidable rod; means responsive to variations of pressure in the said conduit, comprising a piston rod, the two rods being co-axial and inter-connected for unitary movement on their common axis under impulses from said piston rod; and manually operable means for moving said slidable rod independently of movement of said piston rod.

2. In a control device, the combination of a variable-pitch propeller; an aircraft engine for driving said propeller means for feeding a fuel-air mixture to the engine; a conduit between said feeding means and the engine; means for changing the pitch of the propeller, comprising a governor dependent upon the engine speed; a reacting spring in said governor; means for changing the tension of said spring, comprising a reciprocable member bearing against said spring; means responsive to variations of pressure in said conduit, comprising a reciprocable member; a pair of pivotally connected arms, pivotally connected with the two reciprocable members, respectively; a third reciprocable member pivoted on the pivot connecting said arms; and manually operable means for reciprocating said third member, the parts being so disposed and related that the first and second reciprocable members have unitary movement under impulses from the second reciprocable member, and the third reciprocable member moves the first reciprocable member when the second reciprocable member is immovable.

MARCEL LOUIS MENNESSON.